(12) United States Patent
Hetzler et al.

(10) Patent No.: US 7,134,139 B2
(45) Date of Patent: Nov. 7, 2006

(54) SYSTEM AND METHOD FOR AUTHENTICATING BLOCK LEVEL CACHE ACCESS ON NETWORK

(75) Inventors: Steven R. Hetzler, Los Altos, CA (US); Daniel Felix Smith, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1067 days.

(21) Appl. No.: 10/076,732

(22) Filed: Feb. 12, 2002

(65) Prior Publication Data

US 2003/0154412 A1 Aug. 14, 2003

(51) Int. Cl.
*H04L 9/32* (2006.01)
(52) U.S. Cl. .................... 726/2; 709/225; 711/163
(58) Field of Classification Search .............. 726/2
See application file for complete search history.

(56) References Cited

U.S. PATENT DOCUMENTS

| | | | | |
|---|---|---|---|---|
| 4,821,172 A | * | 4/1989 | Kaneko et al. ............... 710/5 |
| 5,491,812 A | | 2/1996 | Pisello et al. .............. 395/500 |
| 5,682,514 A | * | 10/1997 | Yohe et al. ................ 711/118 |
| 5,737,523 A | * | 4/1998 | Callaghan et al. ........... 726/21 |
| 5,761,452 A | * | 6/1998 | Hooks et al. ............. 710/116 |
| 5,802,297 A | * | 9/1998 | Engquist .................... 709/212 |
| 5,835,943 A | * | 11/1998 | Yohe et al. ................ 711/118 |
| 5,864,854 A | * | 1/1999 | Boyle ......................... 707/10 |
| 5,901,228 A | * | 5/1999 | Crawford ................... 705/34 |
| 5,941,972 A | * | 8/1999 | Hoese et al. .............. 710/315 |
| 5,996,024 A | | 11/1999 | Blumenau ................. 709/301 |
| 6,012,085 A | * | 1/2000 | Yohe et al. ................ 709/217 |
| 6,014,667 A | * | 1/2000 | Jenkins et al. ............. 707/10 |
| 6,021,476 A | * | 2/2000 | Segars ....................... 711/163 |
| 6,044,367 A | * | 3/2000 | Wolff ........................... 707/2 |
| 6,067,545 A | * | 5/2000 | Wolff ......................... 707/10 |
| 6,101,508 A | * | 8/2000 | Wolff ........................ 709/223 |
| 6,122,637 A | * | 9/2000 | Yohe et al. ............ 707/103 Y |
| 6,167,438 A | * | 12/2000 | Yates et al. ................ 709/216 |
| 6,185,601 B1 | * | 2/2001 | Wolff ........................ 709/203 |
| 6,192,408 B1 | * | 2/2001 | Vahalia et al. .............. 709/229 |
| 6,195,730 B1 | * | 2/2001 | West ........................... 711/121 |
| 6,219,693 B1 | * | 4/2001 | Napolitano et al. ......... 709/203 |
| 6,260,120 B1 | * | 7/2001 | Blumenau et al. .......... 711/152 |
| 6,295,575 B1 | * | 9/2001 | Blumenau et al. ............. 711/5 |
| 6,308,261 B1 | * | 10/2001 | Morris et al. ............... 712/219 |
| 6,311,213 B1 | * | 10/2001 | Dawson et al. ............ 709/217 |
| 6,421,711 B1 | * | 7/2002 | Blumenau et al. .......... 709/213 |
| 6,421,753 B1 | * | 7/2002 | Hoese et al. ................ 710/305 |
| 6,425,035 B1 | * | 7/2002 | Hoese et al. ................ 710/105 |
| 6,425,036 B1 | * | 7/2002 | Hoese et al. .................. 710/62 |
| 6,463,284 B1 | * | 10/2002 | Nakamura et al. .......... 455/433 |
| 6,493,825 B1 | * | 12/2002 | Blumenau et al. .......... 713/168 |
| 6,502,162 B1 | * | 12/2002 | Blumenau et al. ............. 711/5 |
| 6,678,731 B1 | * | 1/2004 | Howard et al. ............. 709/225 |

(Continued)

OTHER PUBLICATIONS

Kohl et al., The Kerberos Network Authentication Service (V5), Sep. 1993, IETF.*

(Continued)

*Primary Examiner*—Nasser Moazzami
*Assistant Examiner*—David Garcia Cervetti
(74) *Attorney, Agent, or Firm*—John L. Rogitz

(57) ABSTRACT

A data cache for an iSCSI network caches block-level data from WAN servers for use by clients (e.g., LANs). The cache authenticates itself to the WAN servers, and authenticates clients requesting cache access. Mechanisms are provided to prevent clients from accessing cached data intended for other clients.

81 Claims, 2 Drawing Sheets

(ARCHITECTURE)

U.S. PATENT DOCUMENTS

| | | | |
|---|---|---|---|
| 6,683,883 B1* | 1/2004 | Czeiger et al. | 370/401 |
| 6,684,209 B1* | 1/2004 | Ito et al. | 707/9 |
| 6,748,502 B1* | 6/2004 | Watanabe et al. | 711/158 |
| 6,799,255 B1* | 9/2004 | Blumenau et al. | 711/152 |
| 6,807,581 B1* | 10/2004 | Starr et al. | 709/250 |
| 6,816,891 B1* | 11/2004 | Vahalia et al. | 709/214 |
| 6,845,403 B1* | 1/2005 | Chadalapaka | 710/5 |
| 6,857,059 B1* | 2/2005 | Karpoff et al. | 711/209 |
| 6,886,035 B1* | 4/2005 | Wolff | 709/219 |
| 6,952,737 B1* | 10/2005 | Coates et al. | 709/229 |
| 6,952,743 B1* | 10/2005 | Ortega et al. | 710/5 |
| 6,971,044 B1* | 11/2005 | Geng et al. | 714/11 |
| 6,973,455 B1* | 12/2005 | Vahalia et al. | 707/8 |
| 6,976,134 B1* | 12/2005 | Lolayekar et al. | 711/148 |
| 6,985,956 B1* | 1/2006 | Luke et al. | 709/229 |
| 6,988,130 B1* | 1/2006 | Blumenau et al. | 709/213 |
| 6,988,224 B1* | 1/2006 | Robison et al. | 714/47 |
| 6,999,999 B1* | 2/2006 | Camble et al. | 709/215 |
| 7,007,142 B1* | 2/2006 | Smith | 711/162 |
| 2001/0013059 A1* | 8/2001 | Dawson et al. | 709/217 |
| 2001/0037406 A1* | 11/2001 | Philbrick et al. | 709/250 |
| 2001/0049740 A1* | 12/2001 | Karpoff | 709/231 |
| 2002/0007445 A1* | 1/2002 | Blumenau et al. | 711/153 |
| 2002/0010812 A1* | 1/2002 | Hoese et al. | 710/11 |
| 2002/0010813 A1* | 1/2002 | Hoese et al. | 710/11 |
| 2002/0052986 A1* | 5/2002 | Hoese et al. | 710/5 |
| 2002/0059539 A1* | 5/2002 | Anderson | 714/6 |
| 2002/0091844 A1* | 7/2002 | Craft et al. | 709/230 |
| 2002/0108059 A1* | 8/2002 | Canion et al. | 713/201 |
| 2002/0112113 A1* | 8/2002 | Karpoff et al. | 711/4 |
| 2002/0124124 A1* | 9/2002 | Matsumoto et al. | 710/105 |
| 2002/0129246 A1* | 9/2002 | Blumenau et al. | 713/168 |
| 2003/0084209 A1* | 5/2003 | Chadalapaka | 710/5 |
| 2003/0093541 A1* | 5/2003 | Lolayekar et al. | 709/230 |
| 2003/0093567 A1* | 5/2003 | Lolayekar et al. | 709/246 |
| 2003/0105830 A1* | 6/2003 | Pham et al. | 709/216 |
| 2003/0115447 A1* | 6/2003 | Pham et al. | 713/153 |
| 2003/0126200 A1* | 7/2003 | Wolff | 709/203 |
| 2004/0044744 A1* | 3/2004 | Grosner et al. | 709/217 |
| 2004/0078419 A1* | 4/2004 | Ferrari et al. | 709/201 |
| 2004/0078467 A1* | 4/2004 | Grosner et al. | 709/226 |
| 2004/0078599 A1* | 4/2004 | Nahum | 713/201 |
| 2004/0117438 A1* | 6/2004 | Considine et al. | 709/203 |
| 2004/0133634 A1* | 7/2004 | Luke et al. | 709/203 |
| 2004/0153642 A1* | 8/2004 | Plotkin et al. | 713/150 |

OTHER PUBLICATIONS

Bakke et al., Finding iSCSI Targets and Name servers using SLP, Feb. 2001, IETF.*

Black, iSCSI Security Requirements and SRP-based ESP Keys, Aug. 2001, IETF.*

Satran et al., iSCSI, Jan. 2000, IETF.*

IETF.org, Ips Status Pages, accessed Jun. 20, 2006 <http://tools.ietf.org/wg/ips/draft-ietf-ips-iscsi/>.*

Computer Dictionary, 3rd edition, 1997, p. 175.*

Publication: "Internet Protocols for Network-Attached Peripherals". Hotz et al. pp. 1-15. Proceedings of the Sixth NASA Goddard Conference on Mass Storage Systems and Technologies in conjunction with 15th IEEE Symposium on Mass Storage Systems. Mar. 1998.

Publication: "VISA: Netstation's Virtual Internet SCSI Adapter". Van Meter et al. pp. 71-80. ACM. 1998.

* cited by examiner

[ARCHITECTURE]

[AUTHENTICATION TICKET REQUEST]

AUTHENTICACHE SESSION

SYSTEM AND METHOD FOR AUTHENTICATING BLOCK LEVEL CACHE ACCESS ON NETWORK

BACKGROUND OF THE INVENTION

1. Field of the Invention

The present invention relates to block level cache access in network environments.

2. Description of the Related Art

One development arising from the emergence of networked computing such as the Internet is that an entity's data storage requirements can be met by data storage facilities that are remote from the entity's computers but that are accessible over the network. To provide for fast data transfer through the network, data transfer standards such as the so-called iSCSI (Internet Small Computer Systems Interface) standard have been proposed.

The iSCSI protocol is a block level protocol that is very fast and that is optimized for small, simple commands for facilitating data transfers. It is an implementation of the SCSI protocol that was originally developed to support data transfer between a processor and a local data storage, in particular a local hard disk drive. The iSCSI protocol, on the other hand, is designed to work over TCP/IP (Internet Protocol), which is a general purpose, Internet-related protocol for transferring data through a local area network (LAN) or wide area network (WAN) such as the Internet or local area network. iSCSI thus combines the advantages of peripheral communication ability of SCSI with the data transports developed for IP.

Using what was originally a local hard drive transfer protocol (SCSI) in a WAN environment, such as the Internet, poses challenges. Such protocols emphasize speed but not security, since they were developed for non-networked environments. For example, a local client computer or network (e.g., a LAN) might support a high data transfer rate and low latency, whereas a WAN holding a data repository sought to be accessed by the LAN might not support as high a rate and/or have greater latency.

As recognized herein, a cache can be used to address the above-noted problem, since a cache is a device that temporarily holds data in a fast store and thus can be used as a buffer between a fast network and a slow one. A common function of caches is speculatively pre-fetching read data in anticipation of client requests. As also recognized herein, however, current block-level cache devices do not account for data security. Instead, in block level caches a closed, secure network is assumed, or it is assumed that in an open network data security is simply not a concern. The present invention, however, understands that in the type of network-based data storage applications made possible by modern WAN protocols and in particular made possible by iSCSI, data security at a block level cache is indeed a concern, particularly since several clients might use the same cache as a buffer between their faster, local networks and a slower network such as the Internet.

The present invention has recognized the above-noted problems and provides solutions to one or more of them as disclosed below.

SUMMARY OF THE INVENTION

A general purpose computer including a cache device processor is programmed according to the inventive steps herein. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

Accordingly, a cache device is provided that includes a local data storage for fulfilling requests for block storage from clients to block storage servers. The device includes logic including maintaining, in the local data storage, ephemeral copies of write blocks written from write clients to the server. The logic further includes subsequently writing the write block to the server from the local data storage. Moreover, the logic includes receiving requests from read clients to read blocks from the server, requesting the read block from the server if necessary, perhaps as part of a speculative pre-fetch, and storing the blocks in the local data storage, such that subsequent requests for the blocks can be satisfied from the local storage. The device authenticates clients, prior to permitting them to access data in the local data storage.

In a preferred implementation, the server can be a WAN server, and data is transferred to and from the cache device using iSCSI protocol. The authentication can be done by associating a client authenticator, such as a client ticket, with logical units in the storage. The client ticket is selectively granted based on whether the client is successfully authenticated.

As contemplated in one preferred, non-limiting embodiment, the logic executed by the cache device also includes attempting to gain a second authentication ticket from the server so that the cache device can gain access to original data at the server. The second ticket, if granted, is associated with the original data. With the above-mentioned authentication, storage blocks effectively are locked transparently to the clients to facilitate sharing of the data among the clients.

In further non-limiting enhancements, the cache device can be in logical series with a second cache device to effectively increase the local storage size. Or, the devices can operate in parallel to share the workload. Preferably, the cache device establishes an asymmetric queue depth device, such that a number of outstanding requests to the server can exceed a number of outstanding requests from clients.

In further enhancements, the cache device may communicate with clients and servers over a network, and automatically discover new clients and servers on the network. The number of write requests can also be limited to a set of clients, either in data volume or rate of requests, for storage quota management. If desired, sets of administrative specifications can be changed by a server and at least one authenticated client.

Still further, a ticket can be automatically reapplied for if the ticket has expired or will soon expire. Encryption can be used if desired over the network. Also, the client tickets can be stored in the cache device's local storage for efficiency, with the local storage also being potentially encrypted.

In another aspect, a method for communicating data in a network between at least one client and at least one server includes placing data at the block level onto the network, and selectively caching at least some data at a cache device located between a client and a server. The cache device has a local data storage. Using the cache device, clients can be authenticated prior permitting them to access data at the cache device.

In still another aspect, a computer program device includes a computer program storage device that is readable by a digital processing apparatus. A program is on the program storage device, and the program includes instructions that can be executed by the digital processing apparatus for caching data flowing between a server and a client in a network. The program includes means for caching data at a block level in a data storage, as well as means for authenticating a client requesting access to data in the data storage.

In yet another aspect, a system for transferring data between a relatively slower server side and a relatively faster client side over a network using iSCSI includes a data cache between the server side and client side. The cache caches data in a local storage. Preferably, for reliability the cache uses principles of redundancy for storage. Moreover, the data cache authenticates clients prior to sending data in the local storage to the clients.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
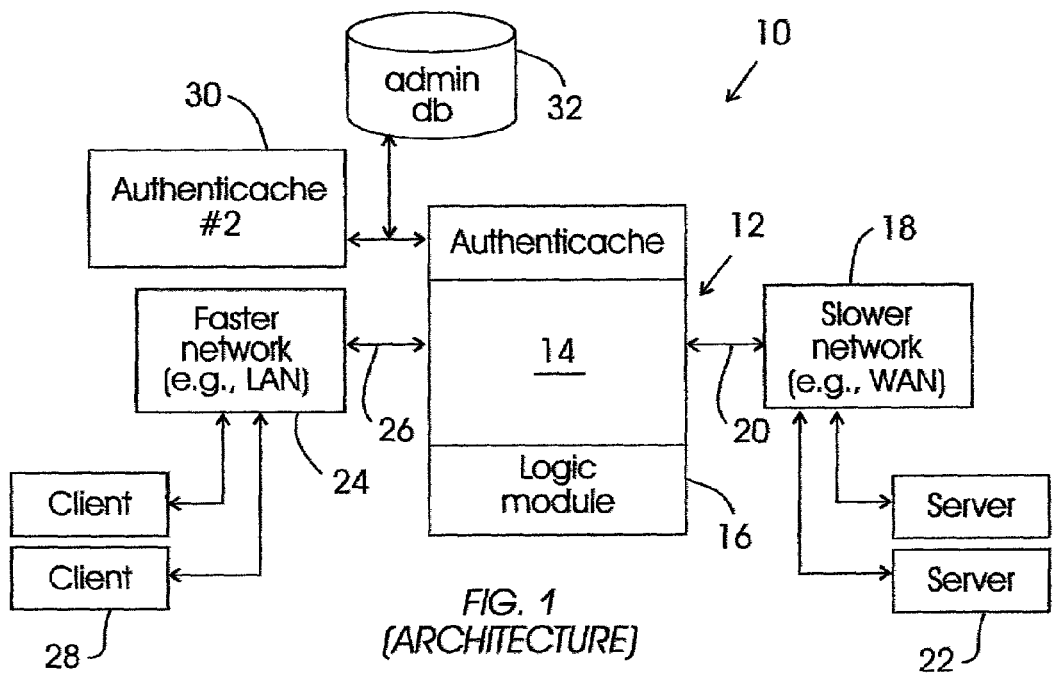
FIG. 1 is a schematic diagram showing the system of the present invention.

Referring initially to FIG. 1, a system is shown, generally designated 10, for permitting network access to a cache device, generally designated 12, to obtain block-level data. The cache device 12 includes a local data storage 14 of, e.g., five hundred gigabytes, encrypted if desired in accordance with encryption principles known in the art, with the device 12 including a processor that executes a logic module 16 for undertaking the present invention.

In one intended embodiment, the processor of the cache device 12 is any appropriate processing device. For instance, it could be a personal computer made by International Business Machines Corporation (IBM) of Armonk, N.Y., or it can be any other appropriate computing device such as a mainframe or laptop computer or network server computer. Preferably, for reliability the cache uses principles of redundancy for storage.

In any case, the cache device 12 communicates with a relatively slower network 18 such as a wide area network, e.g., the Internet, via a network connection 20. In turn, the network 18 communicates with one or more servers 22 that can be data repositories.

Furthermore, the cache device 12 communicates via a network connection 26 with a relatively faster network 24 such as a local area network. Network connections shown in FIG. 1 are illustrative, and other configurations are contemplated, such as where connections 20 and 26 share common paths.

In turn, the network 24 communicates with one or more clients 28 that can be computers, systems, or other client devices requiring access to data in the repositories of the servers 22. Accordingly, not only the clients 28 but the faster network 24 can be thought of as "clients", while not only the servers 22 but the slower network 18 can be thought of as "servers". Furthermore, while the above disclosure refers to a "slower" network 18 and a "faster" network 24, this speed relationship can be reversed, or both networks 18, 24 can operate at the same speed.

In any case, data can be transmitted between the networks 18, 24 via the cache device 12 at the block level. Preferably, the protocol used on the networks 18, 24 includes iSCSI.

With the above overview of the present architecture in mind, it is to be understood that the present logic is executed on the architecture shown in FIG. 1 in accordance with the flow charts discussed below. The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the logic may be embodied by a computer program that is executed by a processor as a series of computer-executable instructions. These instructions may reside, for example, in random access memory (RAM) or on a hard drive or optical drive, magnetic tape, electronic read-only memory, or other appropriate data storage device.

If desired, a second cache device 30 that is substantially identical in configuration and operation to the cache device 12 can be provided. The devices 12, 30 can operate in logical series with each other, increasing the effective size of the local cache storage. Moreover, an administrative database 32 can be provided that is accessible to the cache device 12, 30 such that the cache devices 12, 30 can operate in parallel with each other to split the caching and authentication workload. Preferably, the cache device 12 establishes an asymmetric queue depth device, such that a number of outstanding requests to a server 22 can exceed a number of outstanding requests from clients 28.

Figure 2:
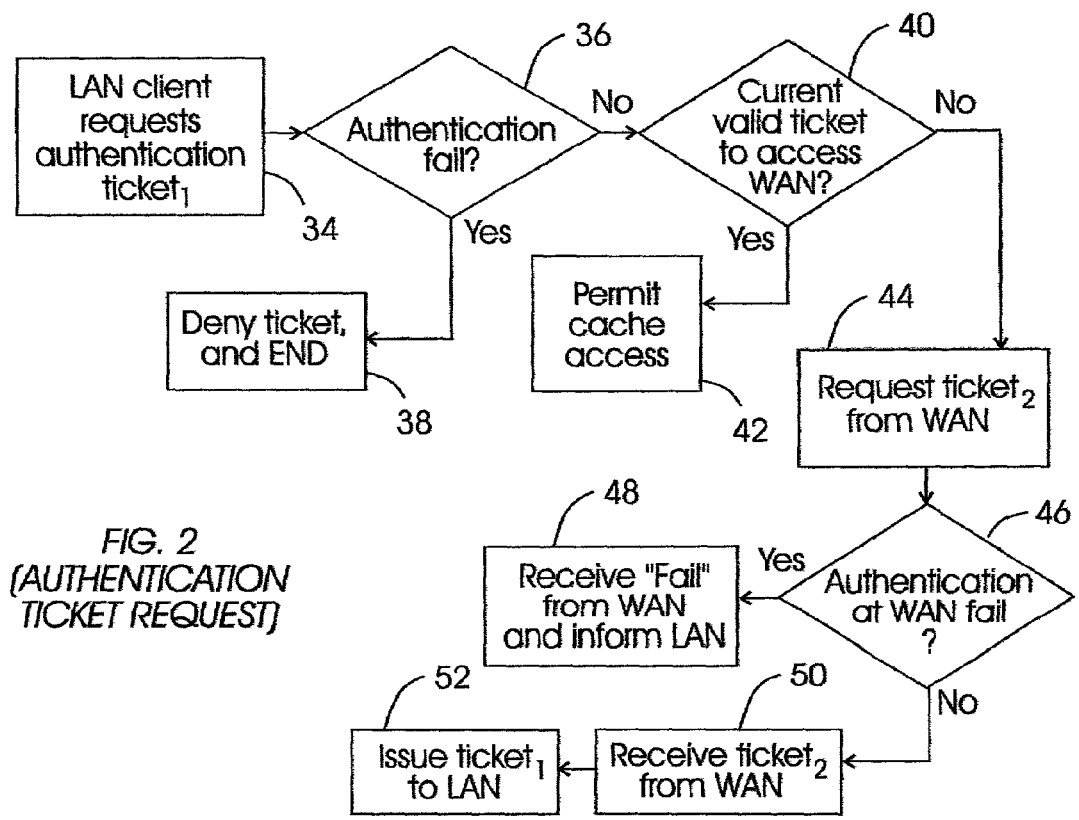
FIG. 2 is a flow chart of the authentication ticket request logic.

Now referring to FIG. 2, the logic for requesting and granting a cache authentication ticket can be seen. It is to be understood that while the present discussion uses the term "ticket", what is broadly meant is any type of authenticator such as a token or other string in accordance with authentication principles. It is to be further understood that data, including requests, can be encrypted and decrypted as appropriate in and among the cache device 12 and networks 18, 24.

It is to be further understood that the cache device 12 can authenticate on behalf of, e.g., a LAN client to a WAN server, as assumed in the discussion below, or it can authenticate itself as a proxy for an (unnamed) LAN client whose identity need not be known to the WAN server. Moreover, allocation of logical storage units in the cache device 12 can be undertaken by the WAN server (when, e.g., the cache device 12 authenticates with the WAN server using the LAN client's identity) or by the cache device 12 (when, e.g., the cache device 12 authenticates itself with the WAN server as a proxy on behalf of a LAN client).

Commencing at block 34, a LAN client requests an authentication ticket, denoted client ticket$_1$, by sending a ticket request to the cache device 12. The ticket request includes a request to access (B, LU . . . ), wherein "B" represents the relevant bus (e.g., an iSCSI bus) and the "LU"s represent logical units in the data storage 14 that can be associated with the requesting client or with the sought-after blocks. At decision diamond 36 the device 12 determines whether authentication failed, i.e., whether the LAN client is not authorized access to the cache data storage 14. If authentication fails, the ticket request is denied and the process ends at block 38.

On the other hand, if the requesting client is authenticated, the data cache device 12 must in turn authenticate itself with the server 22 from which the requested data originates. Accordingly, the logic flows to decision diamond 40 to determine whether the cache device 12 has a current valid authentication ticket with respect to the requested data. If so, the logic simply ends at state 42, wherein the requesting client is permitted access to the requested data.

Otherwise, the cache device 12 must obtain a current cache authentication ticket, denoted $ticket_2$, and in that case the logic would flow to block 44, wherein the cache device 12 requests the cache $ticket_2$ from the WAN server holding the requested data. If authentication at the WAN server fails as determined at decision diamond 46, the logic flows to block 48 to return "fail" and deny access. If this happens, the cache device 12 informs the LAN client. If authentication is successful, however, the logic flows from decision diamond 46 to block 50, wherein the WAN server grants the cache $ticket_2$ to the cache device 12. Then, the cache device 12 issues a corresponding client $ticket_1$ to the requesting client at block 52. The client $ticket_1$ can be stored in the local storage 14 if desired.

Figure 3:
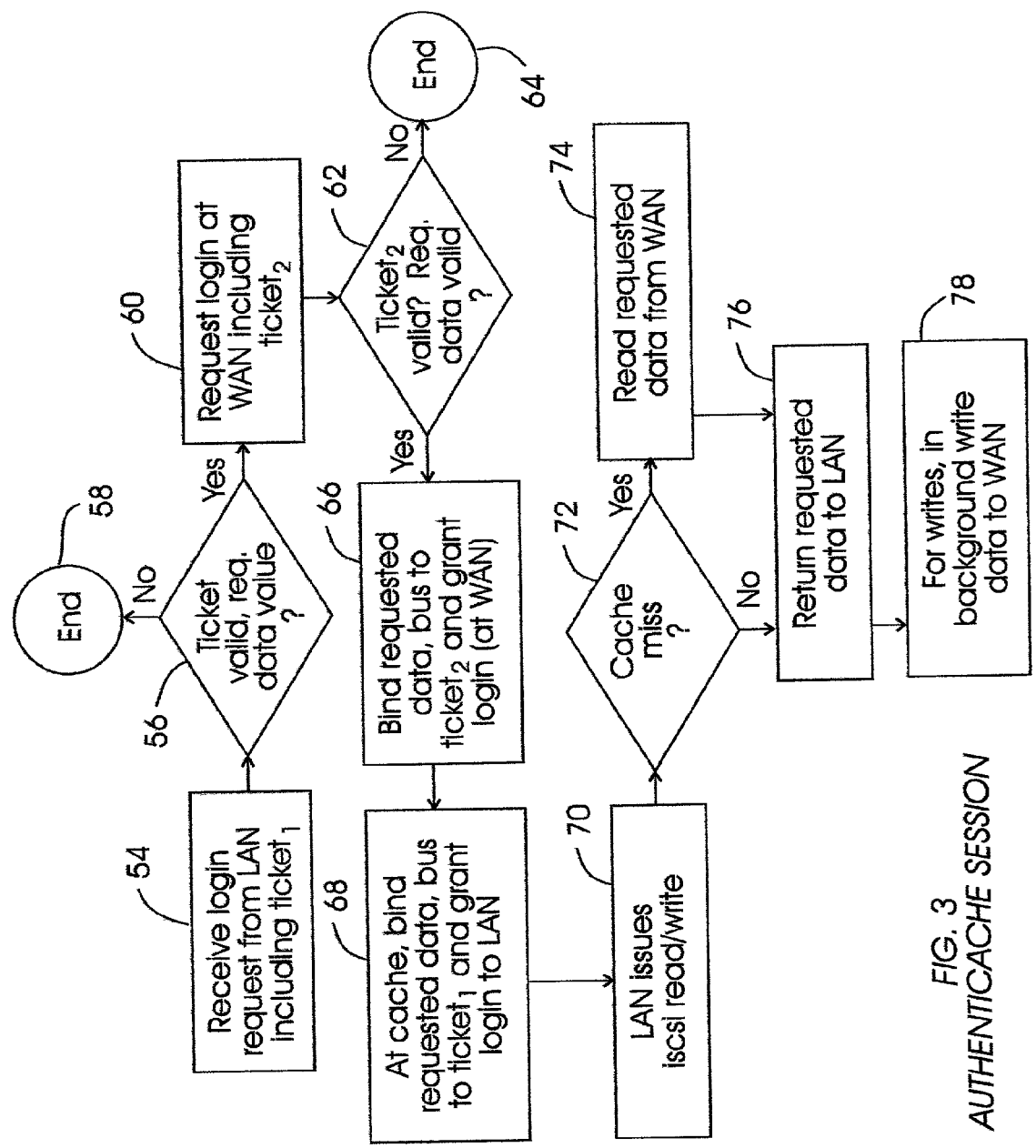
FIG. 3 is a flow chart of the authentication session logic.

Once the above-described process has resulted in issued tickets, the logic of FIG. 3 can be invoked to access data. Commencing at block 54, a login request is received from a requesting client. The request includes a valid client $ticket_1$ along with (B, LU . . . ). At decision diamond 56 it is determined by the cache device 12 whether (B, LU, $ticket_1$) are all valid, and if not, the logic ends at state 58. Otherwise, the logic proceeds to block 60.

At block 60, the cache device 12 requests login at the WAN server including (B', LU' . . . , $ticket_2$), wherein B' is the relevant iSCSI bus at the WAN server and LU' . . . are the logical units at the server, either associated with the cache device 12, or holding the original data having copies stored in the local storage 14 at (LU . . . ). If the server determines validity of the login request at decision diamond 62, the logic proceeds to block 66. An invalid login attempt ends the process at state 64.

At block 66 the requested data (B', LU' . . . ) are bound to the cache device's $ticket_2$, and login is granted. The cache device 12 then binds (B, LU . . . ) to the client $ticket_1$ at block 68 and grants login to the LAN client.

The logic commencing at block 70 is then repeated as necessary for read/write requests. At block 70, a read or write request is received at the cache device 12 from a LAN client. The request includes (B, LU, block), wherein "block" is the specific data block or blocks sought to be read (or written).

At decision diamond 72 the cache device 12 determines whether the request can be satisfied from cache, i.e., from local storage 14. If it cannot be satisfied from local storage 14, the logic moves to block 74 to read the requested data (B', LU', block) from the WAN server holding the original data. From block 74, or from decision diamond 72 when the request is satisfied locally, the logic moves to block 76 wherein the cache device 12 returns the requested data (B, LU, block) to the requesting LAN client. For write operations, the logic can continue to block 78 to write the data received from the client to the WAN server in the background, on a not-to-interfere basis with other cache operations. The server then writes the block to its own repository.

It may now be appreciated that by binding authentication tickets to logical units, one client cannot read data intended for another client. Likewise, the data cache device 12 cannot grant access to data from a server unless the server has approved.

Other security methods can be used, however, in addition to or in lieu of the above. For instance, the data cache can be flushed at the end of each operation. This can be somewhat cumbersome and problematic, however. Further, the cache device 12 can be disconnected from the network and "scrubbed" after each operation, but this too can be cumbersome and can adversely impact performance. Also, encryption of data can be used, with only authorized clients being able to read encrypted data. However, if encrypted data is accessed the encryption might eventually be broken and the data read.

If desired, additional functionality can be provided. For example, the cache device 12 can automatically discover new clients 28 and servers 22 on the network. Moreover, the cache device 12 can limit the number of write requests to a set of clients 28, either in data volume or rate of requests, to essentially establish a storage quota management system. Further, sets of administrative specifications can be changed by authenticated servers 22 and authenticated clients 28. If desired, storage blocks in the local storage 14 can be locked transparently to the clients 28 by the above-described mechanism of associating tickets with logical units, to facilitate sharing of the cache 12 among the clients 28. Still further, the tickets can have expirations, and a ticket that has expired or will soon expire can be automatically reapplied for based on an alert generated by the cache 12 or the granting server 22. In one non-limiting example, the network connections 20, 26 can use encryption. The data cache device 12 can, in accordance with cache principles known in the art, anticipate client requests based on historical requests and adapt accordingly, e.g., by appropriately placing related data close together in the storage 14, to thereby improve client performance.

While the particular SYSTEM AND METHOD FOR AUTHENTICATING BLOCK LEVEL CACHE ACCESS ON NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A cache device including a local data storage for fulfilling requests for block storage from at least one client to at least one block storage server, the cache device performing the steps of:
   maintaining, in the local data storage, an ephemeral copy of at least one write block written from at least a write client to the server;
   subsequently writing the write block to the server from the local data storage;
   authenticating at least a first client, prior to permitting access to the ephemeral copy of at least one write block in the local data storage.

2. The device of claim 1, wherein at least one of: the write client, and cache device, are first clients.

3. The device of claim 1, wherein the server is a wide area network server.

4. The device of claim 1, wherein the logic undertakes the authenticating act at least in part by:
   associating at lean one authenticator with at least one logical unit in the storage.

5. The device of claim 4, wherein the authenticator is a first authentication ticket.

6. The device of claim 5, wherein the first ticket is selectively granted based on whether the first client is successfully authenticated.

7. The device of claim 6, wherein the first ticket is further associated with a data path carrying data from the storage to the client.

8. The device of claim 6, wherein the logic executed by the device includes attempting to gain a second authentication ticket from the server to gain access to data at the server.

9. The device of claim 8, wherein the second ticker, if granted, is associated with the data.

10. The device of claim 1, wherein the device is a first device, and the first device is in logical series with a second device substantially identical in configuration and operation to the first device.

11. The device of claim 1, wherein the device is a first device, and the first device is in combination with an administrative database and a second device substantially identical in configuration and operation to the first device, such that the first and second devices operate in parallel.

12. The device of claim 1, wherein the device establishes an asymmetric queue depth device, such that a number of outstanding requests to the server can exceed a number of outstanding requests from clients.

13. The device of claim 1, wherein the device communicates with clients and servers over a network, and the method acts undertaken by the logic include automatically discovering new clients and servers on the network.

14. The device of claim 1, wherein the method acts undertaken by the logic include limiting a number of write requests to a set of clients, using at least one of: data volume, and rate of requests.

15. The device of claim 1, wherein sets of administrative specifications can be changed by a server and/or at least one authenticated client.

16. The device of claim 1, wherein the method acts undertaken by the logic include locking storage blocks transparently to the clients to facilitate sharing of the cache among the clients.

17. The device of claim 5, wherein a ticket has an expiration, and the method acts undertaken by the logic include automatically reapplying for a ticket that has expired or will soon expire.

18. The device of claim 1, wherein at least one of: the server, and the client, include a network connection operating using encryption.

19. The device of claim 5, wherein the first ticket is stored in the device.

20. The device of claim 1, wherein the local data storage is encrypted.

21. A method for communicating data in a network between at least one client and at least one server, comprising:
   placing data at block level onto the network;
   selectively caching at least some data at one and only one cache device located between a client and a server, the cache device having a local data storage; and
   using the cache device to authenticate at least one client prior permitting the client to access the at least some data at the cache device.

22. The method of claim 21, wherein the server is a wide area network server.

23. The method of claim 21, wherein data is transferred in the network using ISCSI (Internet Small Computer Systems Interface) protocol.

24. The method of claim 21, further comprising:
   associating at least one authenticator with at least one logical unit in the storage holding at least one requested block of data.

25. The method of claim 24, wherein the authenticator is a first authentication ticket.

26. The method of claim 25, wherein the first ticket is selectively granted based on whether a client is successfully authenticated.

27. The method of claim 26, wherein the first ticket is further associated with a data path carrying data from the storage to the client.

28. The method of claim 26, further comprising attempting to gain a second authentication ticket from the server to gain access to data at the server.

29. The method of claim 28, wherein the second ticket, if granted, is associated with the data.

30. The method of claim 21, wherein the cache device is a first device, and the first device is in logical series with a second device substantially identical in configuration and operation to the first device.

31. The method of claim 21, wherein the device is a first device, and the first device is in combination with an administrative database and a second device substantially identical in configuration and operation to the first device, such that the first and second devices operate in parallel.

32. The method of claim 21, wherein the device establishes an asymmetric queue depth device, such that a number of outstanding requests to the server can exceed a number of outstanding requests from clients.

33. The method of claim 21, further comprising automatically discovering new clients and servers on the network.

34. The method of claim 21, further comprising limiting a number of write requests to a set of clients, either in data volume or rate of requests.

35. The method of claim 21, wherein sets of administrative specifications can be changed by a server and/or at least one authenticated client.

36. The method of claim 21, further comprising locking storage blocks transparently to the clients to facilitate sharing of the cache among the clients.

37. The method of claim 25, wherein a ticket has an expiration, and the method includes automatically reapplying for a ticket that has expired or will soon expire.

38. The method of claim 21, wherein at least one of: the server, and the client, include a network connection operating using encryption.

39. The method of claim 25, wherein the first ticket is stored in the cache device.

40. The method of claim 21, wherein the local data storage is encrypted.

41. A device comprising:

a digital processing apparatus; and logic means stored on a computer readable storage device, the storage device being accessed by the digital processing apparatus for caching data flowing between a server and a client in a network, the logic means comprising:

means for caching data at a block level in a cache data storage; and means for authenticating a client requesting access to data in the data storage, wherein the means for authenticating includes means for associating at least one authenticator with at least one logical unit in the cache data storage holding at least one requested block of data, the means for associating selectively granting access based on whether the client is successfully authenticated by the cache data storage.

42. The device of claim 41, further comprising:

means for maintaining, in the data storage, an ephemeral copy of at least one write block written from at least a write client to the server; and means for subsequently writing the write block to the server from the local data storage.

43. The device of claim 41, wherein the server is a wide area network server.

44. The device of claim 4, wherein data is transferred over the network using iSCSI (Internet Small Computer Systems Interface) protocol.

45. The device of claim 41, wherein the authenticator is a first authentication ticket.

46. The device of claim 45, wherein the first ticket is selectively granted based on whether the client is successfully authenticated.

47. The device of claim 41, wherein the first ticket is further associated with a data path carrying data from the storage to the client.

48. The device of claim 46, further comprising means for attempting to gain a second authentication ticket from the server to gain access to original data at the server.

49. The device of claim 48, wherein the second ticket, if granted, is associated with the original data.

50. The device of claim 41, wherein the computer program device is a first device, and the first device is in logical series with a second device substantially identical in configuration and operation to the first device.

51. The device of claim 41, wherein the computer program device is a first device, and the first device is in combination with an administrative database and a second device substantially identical in configuration and operation to the first device, such that the first and second devices operate in parallel.

52. The device of claim 41, wherein the means for caching establishes an asymmetric queue depth device, such that a number of outstanding requests to the server can exceed a number of outstanding requests from clients.

53. The device of claim 41, further comprising means for automatically discovering new clients and servers on the network.

54. The device of claim 42, further comprising means for limiting a number of write requests to a set of clients, either in data volume or rate of requests.

55. The device of claim 41, wherein sets of administrative specifications can be changed by a server and/or at least one authenticated client.

56. The device of claim 41, wherein the means for authenticating further comprises means for locking storage blocks transparently to the clients to facilitate sharing of the cache among the clients.

57. The device of claim 45, wherein a ticket has an expiration, and the device further includes means for automatically reapplying for a ticket that has expired or will soon expire.

58. The device of claim 41, wherein at least one of: the server, and the client, include a network connection operating using encryption.

59. The device of claim 45 wherein the ticket is stored in the device.

60. A system for transferring data between first and second networks, the first network being relatively faster than the second network, comprising:

the first network;

the second network; and a data cache device between the networks; and caching data in a local storage pursuant to transferring the data between the networks, the data cache device and only the data cache device authenticating a client prior to sending data in the local storage to a client.

61. The system of claim 60, wherein the data cached in local storage is at the block level.

62. The system of claim 61, wherein the second network is a wide area network.

63. The system of claim 62, wherein a client communicating with the cache device is authenticated at least in part by:

associating at least one authenticator with at least one logical unit in the storage holding at least one requested block of data.

64. The system of claim 63, wherein the authenticator is a first authentication ticket.

65. The system of claim 64, wherein the first ticket is selectively granted by the cache device based on whether the client is successfully authenticated by the cache.

66. The system of claim 65, wherein the first ticket is further associated with a data path carrying data from the storage to the client.

67. The system of claim 65, wherein the cache device attempts to gain a second authentication ticket from a server on the second network to gain access to data at the server.

68. The system of claim 67, wherein the second ticket, if granted, is associated with the data.

69. The system of claim 68, wherein the cache device serves plural clients on the first network.

70. The device of claim 4, wherein the associating act is undertaken by the server.

71. The device of claim 4, wherein the associating act is undertaken by the cache device.

72. The method of claim 24, wherein the associating act is undertaken by the server.

73. The method of claim 24, wherein the associating act is undertaken by the cache device.

74. The system of claim 63, wherein the associating act is undertaken by the second network.

75. The system of claim 63, wherein the associating act is undertaken by the cache device.

76. The device of claim 41, further comprising:
means for receiving a request from at least a read client to read at least one read block from the server; and
means for scoring the read block in the local data storage, such that subsequent requests for the read block from the read client can be satisfied from the local storage.

77. The device of claim 76, wherein the means for storing the read block stores the read block as a speculative pre-fetch in anticipation of client requests.

78. The cache device of claim 1, wherein the method acts undertaken by the device include:
receiving a request from at least a read client to read at least one read block from the server;
requesting a read block from a server; and
storing the read block in the local data storage, such that subsequent requests for the read block from the read client can be satisfied from the local storage.

79. A cache device including a local data storage for fulfilling requests for block storage from at least one client to at least one block storage server, the cache device including logic for undertaking method acts comprising:
receiving a request from at least a read client to read at least one read block from the server;
requesting a read block from a server;
storing the read block in the local data storage, such that subsequent requests for the read block from the read client can be satisfied from the local storage; and
authenticating at least a first client, prior to permitting access to the read block in the local data storage;
wherein the cache device and only the cache device authenticates the first client.

80. The cache device of claim 79, wherein the method acts undertaken by the device include:
maintaining, in the local data storage, an ephemeral copy of at least one write block written from at least a write client to the server;
subsequently writing the write block to the server from the local data storage.

81. The device of claim 78, wherein the act of requesting a read block from a server is undertaken as a speculative pre-fetch in anticipation of client requests.

* * * * *